UNITED STATES PATENT OFFICE.

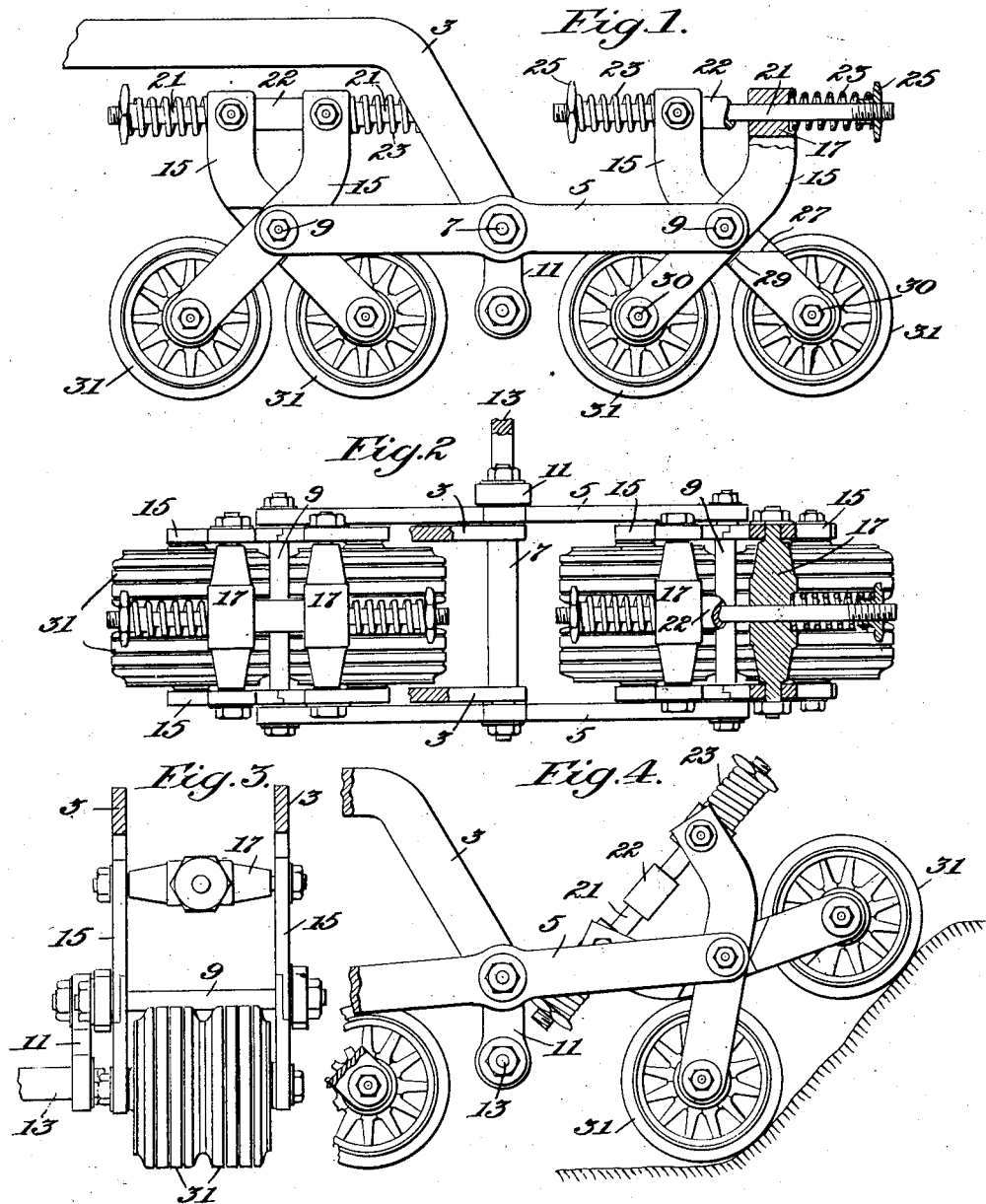

STUART H. CLAPP, OF PITTSFIELD, MASSACHUSETTS.

TRUCK FOR VEHICLES.

1,388,405.  Specification of Letters Patent.  Patented Aug. 23, 1921.

Application filed February 1, 1921. Serial No. 441,597.

*To all whom it may concern:*

Be it known that I, STUART H. CLAPP, a citizen of the United States, residing at Pittsfield, in the county of Berkshire and State of Massachusetts, have invented a certain new and useful Improvement in Trucks for Vehicles, of which the following is a full, clear, and exact description.

This invention relates to resilient buffer or spring suspension mechanism for tractors, trailers, or other load-carrying wheeled vehicles.

One of the objects of the invention is to relieve the chassis, or vehicle body, of road shocks which is accomplished by the employment of buffer or cushioning means, employing either springs, pneumatic or hydraulic devices, or a combination of such devices, so arranged as to dissipate the shock in a direction substantially parallel with the direction of travel of the vehicle. In the apparatus herein shown for purposes of illustration of the invention, and which embodies a preferred construction for carrying out the above and other important objects, the weight of the load is sustained upon a plurality of suitably spaced and disposed pairs of crossed arms, or shears, to which the wheels or rollers upon which the vehicle travels are supported through suitable axles, and such crossed arms or shears are provided at their upper portions with yieldable spring cushion devices, such as spiral springs, which are placed under compression or tension as the pressure of the load varies. Extra or momentary increase of the load serves to distend or separate the upper end portions of the arms or shear members, and the sudden lightening of the load acts to cause the contraction or movement toward each other of the arms or shears, thereby absorbing more or less of the vibration of motion, and relieving the chassis or body of the vehicle and its load of the injurious effects of road shocks.

As the thrust of the weight of the load changes, due to inequalities of the roadbed over which the vehicle is traveling, the cushioning device will contract or extend, in accordance with the variations in pressure imposed by the load, thereby reducing the resulting shocks.

The invention will be best understood from the following detailed description, in connection with the accompanying drawings, in which, Figure 1 represents, in side elevation, partly sectional, four pairs of wheels and the cushioning devices connected thereto, together with certain parts of the frame of the vehicle;

Fig. 2 is a plan view;

Fig. 3 is an end elevation, partly sectional; and

Fig. 4 is a detail view illustrating the position assumed by two of the wheels, with their supporting and cushioning devices, in ascending or descending a grade.

Referring to Fig. 1, the member 3 is a frame member from a vehicle, such as a tractor or trailer, and as exhibited in Fig. 3, a pair of such members is provided in the construction shown, their lower ends being connected with a transverse shaft 7 which connects the side members 5, 5, of the frame of what may be termed a truck, as illustrated herein. Each end of the spaced frame members 5 is rigidly connected by other transverse shafts 9, which constitute the axles upon which the shear-like lever members, which are located in pairs at each end of each shaft 9 at the two ends of the frame member 5, are pivotally mounted.

Referring particularly to Fig. 1, each of the shear members or rocking levers 15, 15, oscillates centrally about the end of its shaft 9, and the lower ends of said shear members receive axles 30, 30, upon which are supported the wheels 31, 31. The face of one of each pair of shear members 15 is cut away or recessed to form shoulders 27, 29, against which the edge of the companion shear member is adapted to abut to limit the relative movement of the shear members in opposite directions. Each of said wheels may comprise a single wheel, or twin wheels, the latter form being illustrated in Fig. 3. The upper end portions of the shear members or levers 15 are pivoted to transverse or cross supporting members 17, 17, said members being perforated to receive a rod 21. As herein shown, the resilient members comprise spiral springs 23, 23, seated upon opposite faces of the trunnioned, transverse brace members 17, 17, and surrounding the end portions of the rod 21. The springs 23 are suitably compressed and held under adjusted tension by nuts 25, which are threaded upon the outer ends of the rod 21, and bear against the springs to hold them under tension. The movement of the upper end portions of the shear members 15 toward each other is limited by suitable spacing sleeves 22 which are applied to the rods 21 and act as stops for the ends of said members. The parts above refererd to are duplicated at each end of the side frame bars or members 5, 5, as clearly shown in Fig. 1.

A rocking member or link 11 may be pivotally sustained upon the outer end portion of the transverse rod 9, of each of the truck units, as illustrated in Fig. 1. The lower end of this link supports one end of a bar or hanger 13 whose other end may be similarly supported from the depending link of a truck or load-carrying member, such as shown in Fig. 1, and which is suitably spaced laterally from such truck.

Under one use of the invention, four trucks, such as shown in Fig. 1, are employed to support a tractor, for example, said trucks being disposed in two pairs, located, respectively, at the front and at the rear of the vehicle, and suitable steering mechanism being provided, as will be found desirable.

As the pressure, due to the load of the vehicle, varies, according to the vibrations which are transmitted to the vehicle due to the inequalities of the road, the shear arms 15, 15, will move upon each other, the wheels spreading apart and contracting and thereby causing the upper ends of the shear arms to move away from and toward each other, and varying the amount of compression of the springs 23 which receive and absorb the shocks due to the vibrations.

A very important feature of the invention lies in the arrangement whereby the pairs of shear arms carrying the wheels are pivoted upon axles or shafts 9, at opposite ends of the frame 5. By such construction each pair of wheels 31 may be caused to rock as an entirety about the axle 9 as a center in ascending or descending grades or in moving over rough or uneven portions of the roadbed, and in Fig. 4 this operation is illustrated, the pairs of wheels being in the act of passing upward over an upwardly inclined portion of the road, the shear members and pairs of wheels rocking as an entirety about the shaft 9. In addition, the frame 5 may rock as an entirety about the shaft 7, which is also illustrated in Fig. 4, wherein it will be seen that the side bar 5 is slightly upwardly inclined at the right hand end, and the capacity of the frame 5 and wheel carrying shear members 15 to rock about the shafts 7, 9, 9, permits of great flexibility and capacity for adaptation to the inequalities of a roadbed, which flexibility and capacity for adaptation is further increased by the yieldable movements of the shear members 15 under the action of the springs 23.

The right is reserved to make such changes in the details of construction or in the relative arrangement of the parts illustrated as are contemplated by the following claims.

What is claimed is:

1. In a device of the character described, the combination of a supporting axle, crossed members pivoted to said axle, wheels supported from the lower ends of said members, and resilient means acting upon the upper ends of said members to cushion their movements under varying conditions of load imposed upon said members.

2. In a device of the class described, the combination of crossed shear members having their opposite ends diverging, wheels supported from axles carried by the lower end portions of said members, and yieldable cushioning devices applied to the upper ends of said members and serving to yieldingly resist their diverging movements under varying load conditions.

3. In a device of the class described, the combination of a frame, axles carried at opposite ends of the frame, spaced pairs of crossed levers rocking upon said axles, wheels carried by the lower ends of said levers, and buffing devices applied to the upper ends of said levers and acting to resiliently resist their movements of separation.

4. In a device of the class described, the combination of pairs of crossed levers supporting axles carrying wheels at their lower ends, trunnioned members connecting opposite arms of said pairs of levers, a rod passing through said trunnioned members, and springs surrounding the said rod and confined between said members and adjusting devices applied to the outer end portions of said rod.

5. In a device of the class described, the combination of pairs of crossed levers supported upon suitable axles, wheels on axles carried by the lower divergent ends of said levers, trunnioned members connecting opposite arms of said pairs of levers, a rod passing freely through said members, a spacing sleeve surrounding said rod and acting to limit the inward movement of said levers, springs surrounding said rod and seated upon the outer faces of said members, and nuts threaded to the rods and bearing adjustably upon said springs.

6. In a device of the class described, the combination of a frame comprising spaced side members, axles connecting the opposite end portions of said members, spaced pairs of crossed shear members pivotally supported near the ends of each of said axles, transverse brace members connecting the opposite arms of each pair of shear members, rods slidably fitted in said brace members, and adjustable yielding means confined between the opposite outer faces of said brace members and acting to resiliently resist the movements of the shear members about the axles of the frame upon which said shear members are supported.

7. In a device of the class described, the combination of a frame comprising spaced side members, axles connecting opposite ends of said members, transversely separated pairs of shear members rockingly supported upon the end portions of said axles, pairs of wheels located at the lower extremities of said shear members, brace members connected opposite shear members, rods extending through said brace members, springs surrounding said rods, and seated upon the opposite outer faces of said brace members, and nuts threaded to said rods and acting to adjust the tension of said springs.

In testimony whereof I have hereunto set my hand this twenty-sixth day of Jan. A. D. 1921.

STUART H. CLAPP.